(12) United States Patent
Tanaka et al.

(10) Patent No.: US 6,527,429 B1
(45) Date of Patent: Mar. 4, 2003

(54) DUST-FREE RUBBER MIXER

(75) Inventors: Hiroyuki Tanaka, Settsu (JP); Tsuyoshi Noguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/890,062

(22) PCT Filed: Jan. 21, 2000

(86) PCT No.: PCT/JP00/00277

§ 371 (c)(1),
(2), (4) Date: Jul. 26, 2001

(87) PCT Pub. No.: WO00/44541

PCT Pub. Date: Aug. 3, 2000

(30) Foreign Application Priority Data

Jan. 29, 1999 (JP) .............................. 11-22706

(51) Int. Cl.⁷ ................................. B29B 7/86
(52) U.S. Cl. ........................ 366/75; 366/97; 366/139
(58) Field of Search .................. 366/75, 96, 97, 366/100, 331, 347, 348, 349, 139, 142

(56) References Cited

U.S. PATENT DOCUMENTS

| | | | |
|---|---|---|---|
| 3,318,606 A | | 5/1967 | Houck |
| 3,811,658 A | * | 5/1974 | Heidrich ..................... 366/142 |
| 5,476,319 A | | 12/1995 | Blah |
| 5,716,130 A | * | 2/1998 | Wood ........................... 366/75 |
| 5,881,338 A | | 3/1999 | Armstrong et al. |
| 5,882,112 A | * | 3/1999 | Peter ........................... 366/75 |

FOREIGN PATENT DOCUMENTS

| | | | |
|---|---|---|---|
| DE | 196 30 021 | * | 1/1998 |
| EP | 0 820 845 A1 | | 1/1998 |
| EP | 0 820 845 | * | 1/1998 |
| JP | 07 009436 A | | 1/1995 |
| JP | 07 016445 A | | 1/1995 |
| JP | 7-33612 | | 6/1995 |
| JP | 07 308921 A | | 11/1995 |
| JP | 7-308921 | | 11/1995 |
| JP | 11-240009 | | 9/1999 |
| JP | 11 266560 A | | 9/1999 |

OTHER PUBLICATIONS

English language translation of International Preliminary Examination Report for PCT/JP00/00277, dated Apr. 6, 2001.

* cited by examiner

*Primary Examiner*—Tony G. Soohoo
(74) *Attorney, Agent, or Firm*—Sughrue Mion, PLLC

(57) ABSTRACT

To provide a dust-free rubber mixer which does not release contaminants such as dusts generated in the rubber mixer into a working room. In the dust-free rubber mixer comprising a rubber mixing section having a plurality of rubber mixing rolls and a driving section having a motor, the whole parts of the rubber mixer except the rubber mixing rolls are covered with a casing, air intakes are provided on the casing in a periphery of rotation shafts of the rubber mixing rolls, an exhaust duct is provided on the casing and air suction means for making the inside pressure of the casing reduced is provided on the exhaust duct.

13 Claims, 6 Drawing Sheets

US 6,527,429 B1

DUST-FREE RUBBER MIXER

TECHNICAL FIELD

The present invention relates to a rubber mixer which does not release generated contaminants such as dust into a working room, can reduce an amount of the contaminants adhering to a rubber during mixing thereof and can give a clean rubber compound.

BACKGROUND ART

Hitherto rubber mixing has been carried out by using a rubber mixer as shown in FIG. 6 to prepare a rubber compound. A rubber mixer 1 usually comprises a driving section 3 comprising a motor 7, an emergency shutdown mechanism (clutch) 8 and a speed reduction mechanism 9 and a rubber mixing section 2 comprising two rubber rolls 4 and bearings 6 supporting rotation shafts 5 of the rolls and having an oil reservoir. The speed reduction mechanism 9 and the rubber mixing rolls 4 to be driven are connected by means of a chain or belt 10. The driving section 3 is covered with a covering 21 and a fan for air-cooling of the motor 7 is provided inside thereof. Air in a working room 14 is taken into the driving section through an air intake part 22 of the covering 21 and is exhausted through an air exhausting part 23 into the working room 14.

In such a rubber mixer, fine particles of metal and oil mist are generated from the motor 7, speed reduction mechanism 9 and bearings 6, and fine particles of metal are generated from the emergency shutdown mechanism 8. Those fine particles of metal and oil mist are spread in the working room 14 by the fan and contaminate air in the working room. If the inside of the working room is contaminated, a clean rubber compound cannot be obtained even if a clean rubber material is used.

An object of the present invention is to provide a dust-free rubber mixer which does not release various dusts (fine particles of metal and oil mist) to be generated from the rubber mixer into the working room.

DISCLOSURE OF INVENTION

Namely the present invention relates to a dust-free rubber mixer, in which rubber mixing rolls and a driving section are isolated from the outside atmosphere by means of a casing and an air intake for suction of air into the inside of the casing is provided in a periphery of rotation shafts of the rubber mixing rolls which are contact portion with the casing.

Also the present invention relates to a dust-free rubber mixer comprising a rubber mixing section having a plurality of rubber mixing rolls and a driving section having a motor, in which the whole parts of the rubber mixer except the rubber mixing rolls are covered with a casing, an air intake is provided on the casing in a periphery of rotation shafts of the rubber mixing rolls, an exhaust duct is provided on the casing and air suction means for making the inside pressure of the casing reduced is provided on the exhaust duct.

In the rubber mixer of the present invention, the parts thereof except the rubber mixing rolls are isolated from air in the working room by means of the casing and since the inside pressure of the casing is reduced, dusts generated inside the casing are not released into the working room.

Therefore the rubber mixer of the present invention exhibits a good effect particularly when installed in a clean room.

BEST MODE FOR CARRYING OUT THE INVENTION

Preferred embodiments of the dust-free rubber mixer of the present invention are an embodiment in which the casing is a covering of the rubber mixer (Embodiment 1) and an embodiment in which the casing is an enclosure provided outside a covering of the rubber mixer (Embodiment 2).

Figure 1:
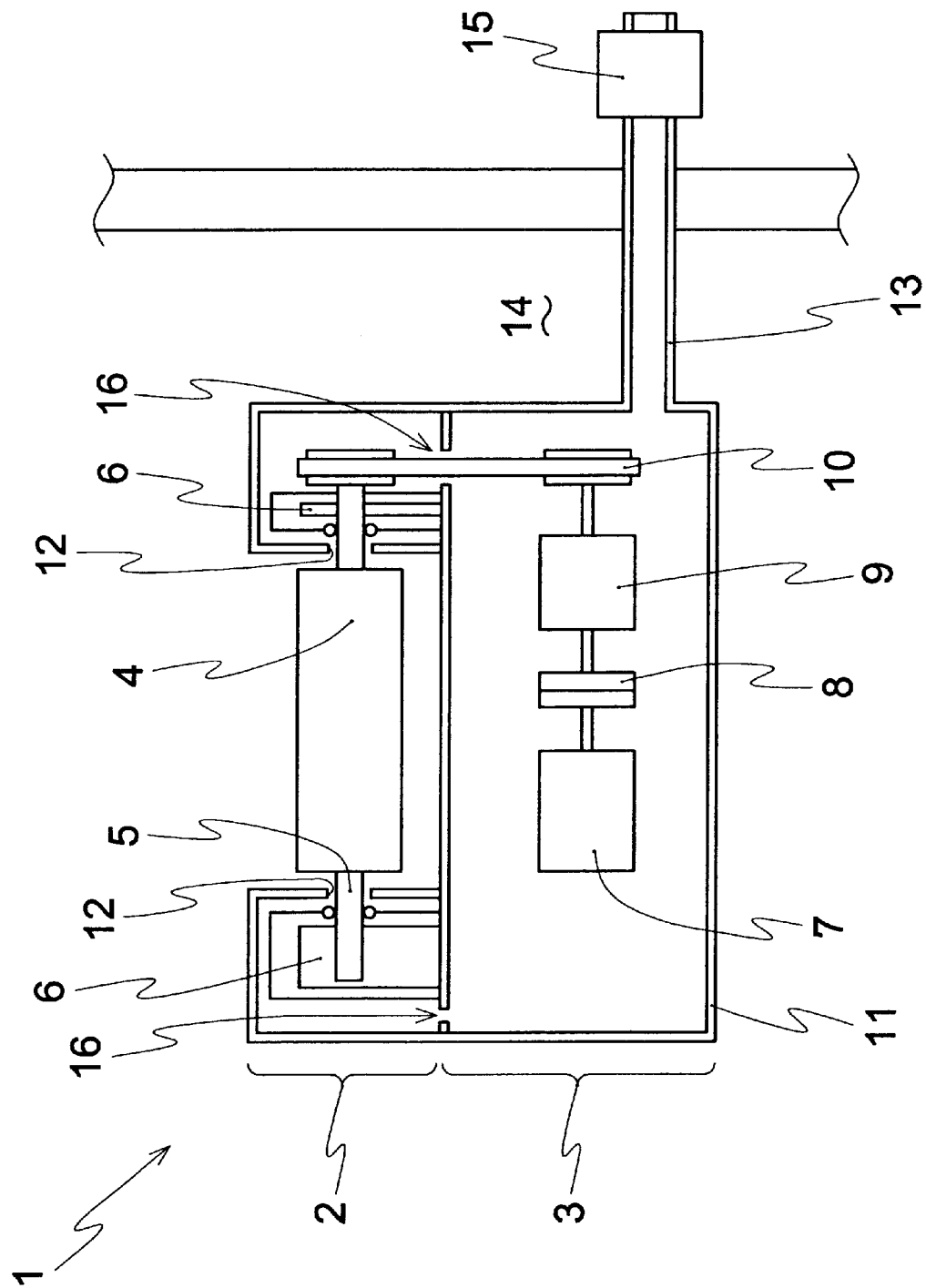
FIG. 1 is a diagrammatic cross-sectional view of Embodiment 1 of the present invention.

FIG. 1 is a diagrammatic cross-sectional view of the above-mentioned Embodiment 1.

The rubber mixer 1 comprises the rubber mixing section 2 and the driving section 3. In the rubber mixing section 2, the rubber mixing rolls 4 (usually comprising two rolls, i.e. a drive roll 4a and a counter roll 4b. cf. FIG. 2) and the rotation shafts 5 of the rolls are supported by the bearings 6. The driving section 3 is composed of the motor 7, emergency shutdown mechanism 8 and speed reduction mechanism 9, and the speed reduction mechanism 9 and the drive roll 4a are connected by means of a chain or belt 10.

One of the features of Embodiment 1 is that the whole parts of the rubber mixer except the rubber mixing rolls 4 are covered with the casing 11 and the casing 11 is a covering of the rubber mixer.

The casing 11 (outer casing) is provided with the air intakes 12 in a periphery of the rotation shafts 5 of the rubber mixing rolls 4 and also the exhaust duct 13 at the bottom of the driving section 3. The exhaust duct 13 is connected to the outside of the working room 14 (for example, a clean room in a technical field of production of semi-conductors). Also the exhaust duct 13 is provided with air suction means 15 such as a suction pump.

In Embodiment 1, since the casing is a covering, the rubber mixing section 2 and the driving section 3 are connected through the openings 16.

Figure 2:
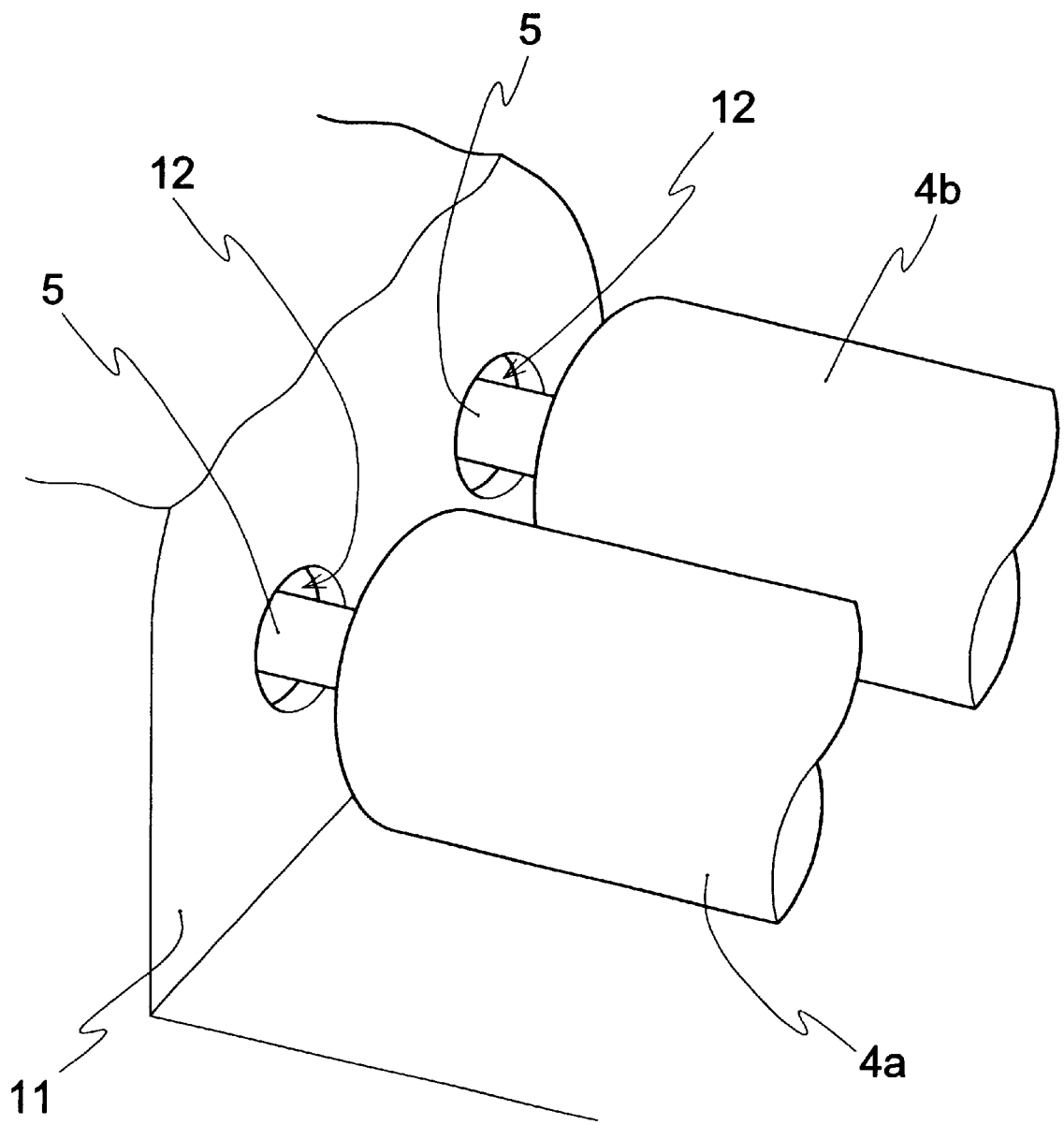
FIG. 2 is a diagrammatic partial perspective view of an end of the rubber mixing roll of Embodiment 1 of the present invention.

A periphery of the air intakes 12 is illustrated in FIG. 2 for easy understanding. FIG. 2 is a diagrammatic partial perspective view of a neighborhood of one end of the rubber mixing rolls 4a and 4b and shows that the air intakes 12 are provided between the casing 11 and the rotation shafts 5. A shape of the air intakes 12 is not limited to a circle and may be in the rectangular or elliptical form. The most suitable location of the air intakes is a periphery of the rotation shafts of the rubber mixing rolls. However alternatively or in addition to the periphery of the rotation shafts, the air intakes may be provided on various parts if necessary as far as an air-suction velocity at the rotation shafts is not influenced.

Figure 3:
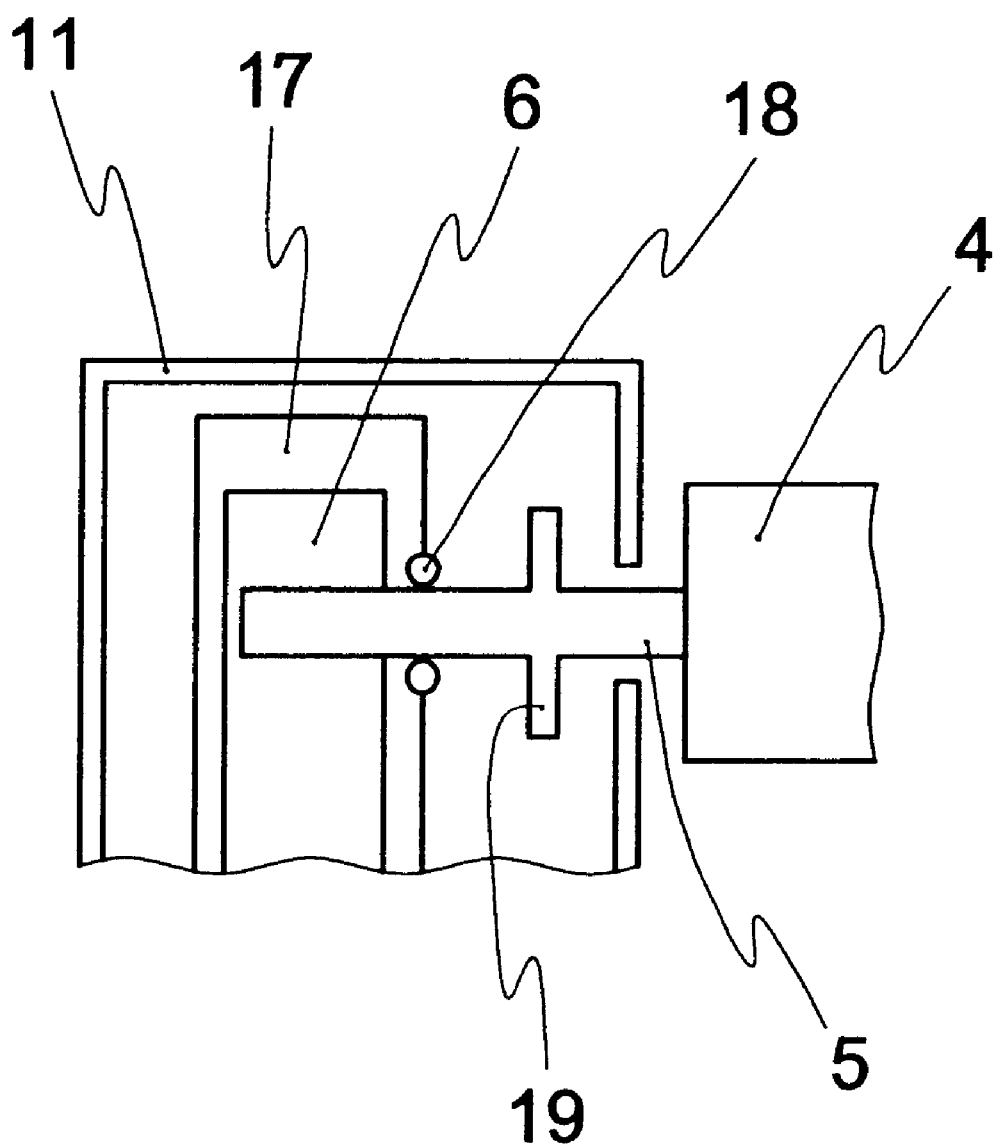
FIG. 3 is a diagrammatic cross-sectional view of an end and bearing part of the rubber mixing roll of Embodiment 1 of the present invention.

Also as shown in FIG. 3, in some cases, the bearing 6 is provided with an oil reservoir 17 for oil seal 18. When such a bearing is used, there is a case where oil is scattered from the oil seal toward the roll 4. In order to prevent the scattering of oil, a disk-like collar 19 may be provided on the rotation shaft 5 inside the casing 11.

Then operation of Embodiment 1 of the present invention is explained below. First before starting of rubber mixing operation, the air suction means 15 is started to exhaust air in the driving section 3 outside the working room 14 through the exhaust duct 13 and make the inside pressure of the drive section 3 reduced. Thereby air in the rubber mixing section 2 enters into the driving section 3 through the opening 16 to make the inside pressure of the rubber mixing section 2 reduced and then feed air in the working room 14 into the casing through the air intake 12. Thus an air flow of working room 14→air intake 12→inside of rubber mixing section 2 in the casing→opening 16→inside of driving section 3→exhaust duct 13→outside of the working room is formed. At that stage the motor is started to start the rubber mixing operation. When terminating the operation, the motor is stopped and then the air suction means is stopped.

As mentioned above, during the rubber mixing operation, since the inside of the rubber mixer is always under reduced pressure, dusts generated in the rubber mixer are not released inside the working room. In addition, dusts being present in the working room can also be exhausted to the outside thereof.

A fan for cooling the motor (shown in FIG. 6) may be provided or may not be provided. Also a dust filter (not illustrated) may be provided in the exhaust duct.

Figure 4:
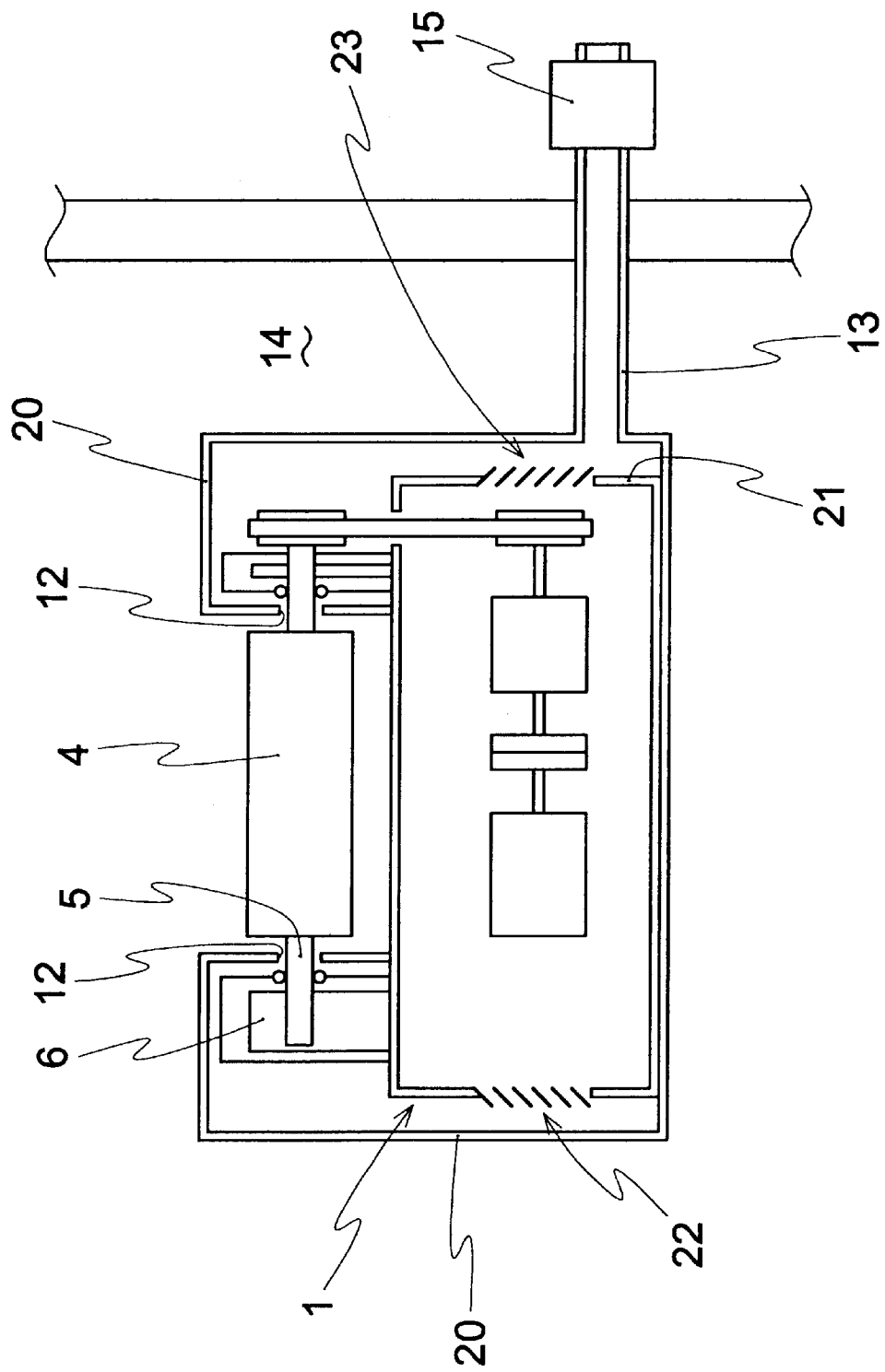
FIG. 4 is a diagrammatic cross-sectional view of Embodiment 2 of the present invention.
Figure 6:
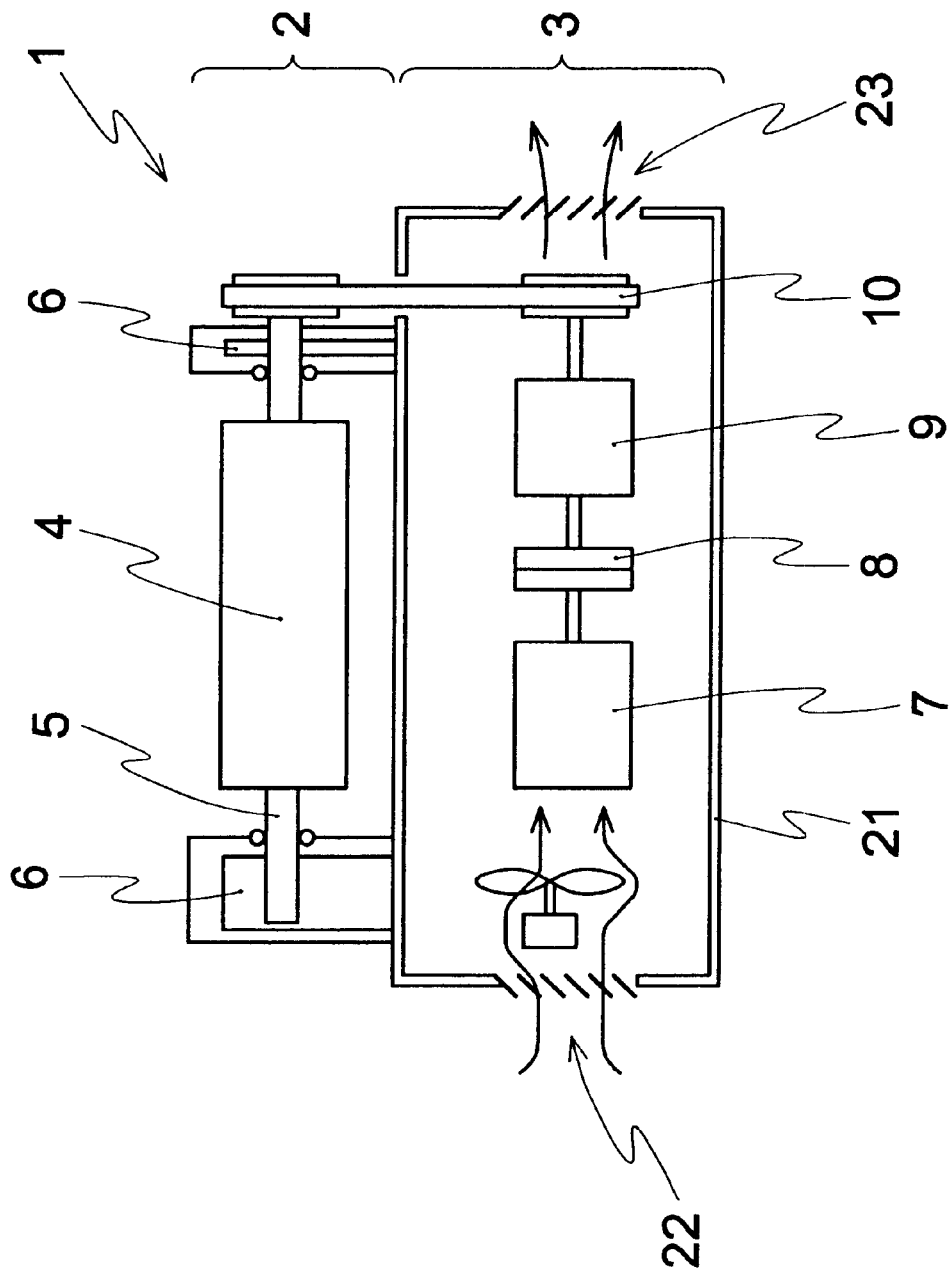
FIG. 6 is a diagrammatic cross-sectional view of a conventional rubber mixer.

Then Embodiment 2 of the present invention is explained by using FIG. 4. FIG. 4 is a diagrammatic cross-sectional view of Embodiment 2 which basically has such a construction that the conventional rubber mixer shown in FIG. 6 is covered with a casing. Also since a basic construction of the rubber. mixing section 2 and the driving section 3 of the rubber mixer 1 is the same as that shown in FIG. 6 (and FIG. 1), explanation thereof is deleted.

A feature of Embodiment 2 is that the whole of rubber mixer 1 is covered with the casing 20 except the air intakes 12 being left open in a periphery of the rotation shafts 5 of the rubber mixing rolls 4, the covering 21 of the driving section 3 is provided with the air intake part 22 and air exhausting part 23, and the exhaust duct 13 and the air suction means 15 are provided at the bottom of the casing 20.

Examples of the air intake 12, operation of the rubber mixer and effects of exhausting dusts are the same as in Embodiment 1. The air flows of Embodiment 2 are inside of working room 14→air intake 12→air intake part 22→inside of driving section 3→air exhausting part 23→exhaust duct 13→outside of working room, and inside of working room 14→air intake 12→exhaust duct 13→outside of working room.

Embodiment 2 has a merit that a conventional rubber mixer can be used as it is.

The basic construction of the dust-free rubber mixer of the present invention is that the whole rubber mixer except the rubber mixing rolls is covered with the casing, thereby enabling the inside of the working room for rubber mixing to be maintained in a highly clean state.

Further it is preferable to form the casing as mentioned below in order to maintain the inside of the working room in a clean state.

Figure 5:
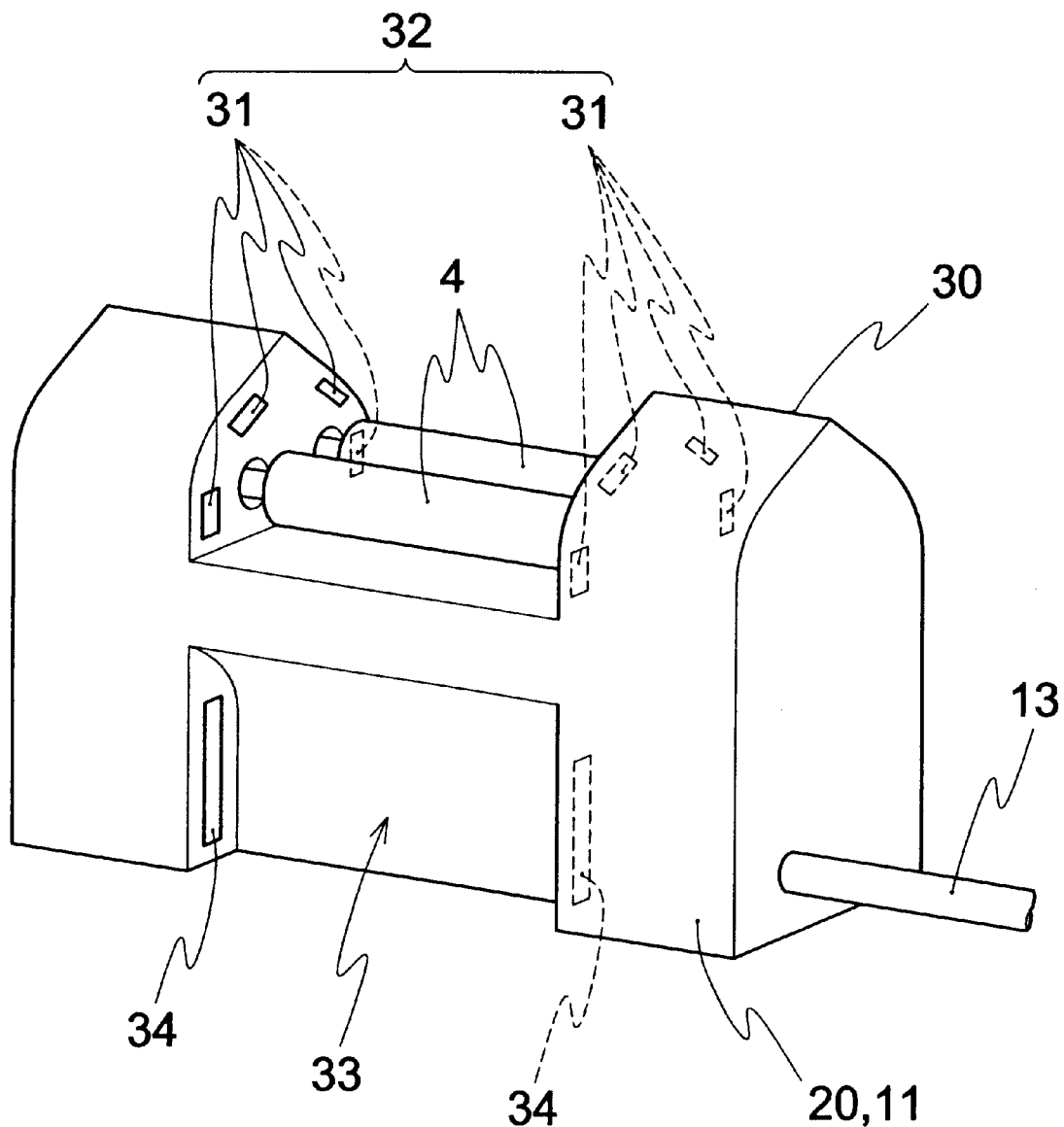
FIG. 5 is a diagrammatic perspective view of other embodiment of the present invention.

For example, there is a case where dusts floating inside the working room fall on and adhere to the rubber mixer and removal thereof is difficult. In that case, as shown in FIG. 5,
the top 30 of the casings 11 and 20 is formed into a gable roof and angled parts are minimized. Thus dusts falling on the rubber mixer can be dropped on a floor and removal of the dusts becomes easy.

Also surfaces of the casings 11 and 20 are made smooth and an electrically conductive material such as stainless steel is used for the casings and the casings are put to earth. Thus adhering of dusts can be reduced and dropping thereof from the casings can be accelerated.

Since it is better to make the outer surfaces of the casings 11 and 20 as smooth as possible, the emergency shutdown switch requiring a moving part causes adhering and accumulation of dusts thereon. Therefore it is preferable that as shown in FIG. 5, for example, a noncontact emergency shutdown switch 32 is provided so that photo sensors 31 such as infrared sensors provided being faced opposite to each other on the walls of the casings 11 and 20 at the side of roll 4 can sense invasion of a hand and cloth into a sensing range during operation. Thereby emergency shutdown is carried out in case of the invasion. A voice-operated switch can also be used as a non-contact switch. Also when assuming that the both hands of the operator are engaged and cannot be used, it is preferable to provide a concave portion 33 on the casing of the driving section 3 and set non-contact emergency shutdown switches 34 which can be actuated by foot as shown in FIG. 5.

Further from the viewpoint of prevention of adhesion of dusts, it is preferable that a panel switch is used as a switch for the air suction means and as each drive switch though they are not illustrated and a surface of the panel is covered with a fluorine-containing resin film.

The dust-free rubber mixer of the present invention can produce a clean rubber compound and therefore can be suitably used in a clean room, for example, in a preparation process of starting materials for various parts for semiconductor production equipment, particularly sealing materials such as O-ring, square ring, gasket and packing.

Industrial Applicability

The dust-free rubber mixer of the present invention does not release fine particles of metal and oil mist generated from the rubber mixer into a working room and can increase cleanliness of the working room.

What is claimed is:

1. A dust-free rubber mixer, in which rubber mixing rolls and a driving section are isolated from an outside atmosphere by means of a casing and air intakes for suction of air into the inside of the casing are provided in a periphery of rotation shafts of the rubber mixing rolls which are contact portion with the casing.

2. The dust-free rubber mixer of claim 1, wherein the casing is a covering of the rubber mixer.

3. The dust-free rubber mixer of claim 1, wherein the casing is an enclosure provided outside a covering of the rubber mixer.

4. The dust-free rubber mixer of claim 1, wherein the top of the casing is in the form of gable roof.

5. The dust-free rubber mixer of claim 1, which is provided with a non-contact switch having no moving part as emergency shutdown means.

6. The dust-free rubber mixer of claim 1, wherein an outer surface of the casing is smooth.

7. A dust-free rubber mixer comprising a rubber mixing section having a plurality of rubber mixing rolls and a driving section having a motor, in which the whole parts of the rubber mixer except the rubber mixing rolls are covered with a casing, air intakes are provided on the casing in a periphery of rotation shafts of the rubber mixing rolls, an exhaust duct is provided on the casing and air suction means for making the inside pressure of the casing reduced is provided on the exhaust duct.

8. The dust-free rubber mixer of claim 7, wherein the casing is a covering of the rubber mixer.

9. The dust-free rubber mixer of claim 7, wherein the casing is an enclosure provided outside a covering of the rubber mixer.

10. The dust-free rubber mixer of claim 7, wherein the top of the casing is in the form of gable roof.

11. The dust-free rubber mixer of claim 7, which is provided with a non-contact switch having no moving part as emergency shutdown means.

12. The dust-free rubber mixer of claim 7, wherein an outer surface of the casing is smooth.

13. The dust-free rubber mixer of claim 7, which is installed in a clean room.

* * * * *